(12) United States Patent
Kusuda et al.

(10) Patent No.: US 8,607,757 B2
(45) Date of Patent: Dec. 17, 2013

(54) INTAKE MANIFOLD FOR PREVENTING FLOW NOISE

(75) Inventors: Kenji Kusuda, Tokai (JP); Hironori Tanikawa, Anjyo (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 272 days.

(21) Appl. No.: 12/963,853

(22) Filed: Dec. 9, 2010

(65) Prior Publication Data
US 2011/0146612 A1    Jun. 23, 2011

(30) Foreign Application Priority Data

Dec. 17, 2009    (JP) .................................. 2009-286378

(51) Int. Cl.
*F02M 35/12*    (2006.01)

(52) U.S. Cl.
USPC ............ 123/184.53; 123/184.21; 123/184.41; 123/184.61; 123/179.16; 123/590; 181/270; 251/127

(58) Field of Classification Search
USPC ............ 123/184.21, 184.41, 184.61, 179.16, 123/590; 181/270; 251/127
See application file for complete search history.

(56) References Cited

U.S. PATENT DOCUMENTS

| | | | | |
|---|---|---|---|---|
| 3,965,873 A | * | 6/1976 | Konomi et al. | 123/184.53 |
| 4,691,894 A | * | 9/1987 | Pyotsia et al. | 251/127 |
| 5,809,961 A | | 9/1998 | Morota et al. | |
| RE40,621 E | * | 1/2009 | Choi | 123/590 |
| 7,707,986 B1 | * | 5/2010 | Plaxton | 123/184.53 |
| 7,730,997 B2 | * | 6/2010 | Asada et al. | 181/270 |

FOREIGN PATENT DOCUMENTS

| | | |
|---|---|---|
| EP | 0 807 755 | 11/2001 |
| EP | 1 008 744 | 11/2002 |
| JP | 09-303223 | 11/1997 |
| JP | 11141420 | 5/1999 |
| JP | 2007-247547 | 9/2007 |

OTHER PUBLICATIONS

Japanese Office Action for JP 209-286378, mailed on Dec. 25, 2012, and English translation.

* cited by examiner

*Primary Examiner* — Lindsay Low
*Assistant Examiner* — Kevin Lathers
(74) *Attorney, Agent, or Firm* — Ladas & Parry, LLP

(57) ABSTRACT

An intake manifold capable of being connected with a throttle valve apparatus includes a conducting pipe defining an air intake pathway therein, a surge tank for receiving air flowing from the throttle valve apparatus through the air intake pathway, and a noise prevention net placed within a half of a cross section of the air intake pathway. The noise prevention net has a net portion for reducing noise volume and defines at least one opening outside of the net portion in a radial direction in the cross section of the air intake pathway such that the opening is positioned along or near an inner wall of the conducting pipe.

5 Claims, 6 Drawing Sheets

INTAKE MANIFOLD FOR PREVENTING FLOW NOISE

CROSS-REFERENCES TO RELATED APPLICATIONS

This application claims priority to Japanese patent application No 2009-286378, the components of which are incorporated herein by reference.

BACKGROUND OF THE INVENTION

1. Field of the Invention

The present disclosure relates to an intake manifold for introducing air into an engine, in particular, an intake manifold capable of reducing flow noise generated between a throttle valve and a surge tank.

2. Description of the Related Art

An automobile has an intake manifold for introducing air into an engine. The intake manifold is connected with a throttle valve apparatus located at an upstream side of the intake manifold. The throttle valve is opened and closed in order to control incoming airflow.

The intake manifold generally has a surge tank for receiving air taken by the throttle valve apparatus. In a state that negative pressure, i.e., pressure less than that of the air taken by the throttle valve apparatus, is kept in the surge tank of this intake manifold, when the throttle valve apparatus is opened, the air flows into the surge tank in bursts. The air flowing into the surge tank eddies downstream of the throttle valve apparatus, and thus generates high-frequency noise. This noise is so called as "shupo-on", and sound volume of the noise tends to increase in a state that the surge tank is constructed by resin.

Japanese Laid-Open Patent Publication No. 11-141420 discloses a net located near the throttle valve apparatus in an air intake pathway from the throttle valve apparatus to the surge tank, i.e., downstream of the throttle valve apparatus, for decreasing eddy of the air, thereby reducing the noise.

There has been a need in the art for an improved intake manifold.

SUMMARY OF THE INVENTION

One aspect according to an intake manifold of this disclosure, which is capable of being connected with a throttle valve apparatus, includes a conducting pipe defining an air intake pathway therein, a surge tank for receiving air flowing from the throttle valve apparatus through the air intake pathway, and a noise prevention net placed within a half of a cross section of the air intake pathway. The noise prevention net has a net portion for reducing noise volume and defines at least one opening outside of the net portion in a radial direction in the cross section of the air intake pathway such that the opening is positioned along or near an inner wall of the conducting pipe The noise prevention net can reduce the sound volume of the noise, and the opening reduces airflow resistance when the air flows through the noise prevention net. Therefore, it is able to reduce noise volume and to increase the air flowing into the surge tank.

DETAILED DESCRIPTION OF THE PREFERRED EMBODIMENTS

Each of the additional features and teachings disclosed above and below may be utilized separately or in conjunction with other features and teachings to provide improved intake manifolds. Representative examples of the present disclosure, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first embodiment of the present disclosure will be described in reference to attached drawings.

Figure 1:
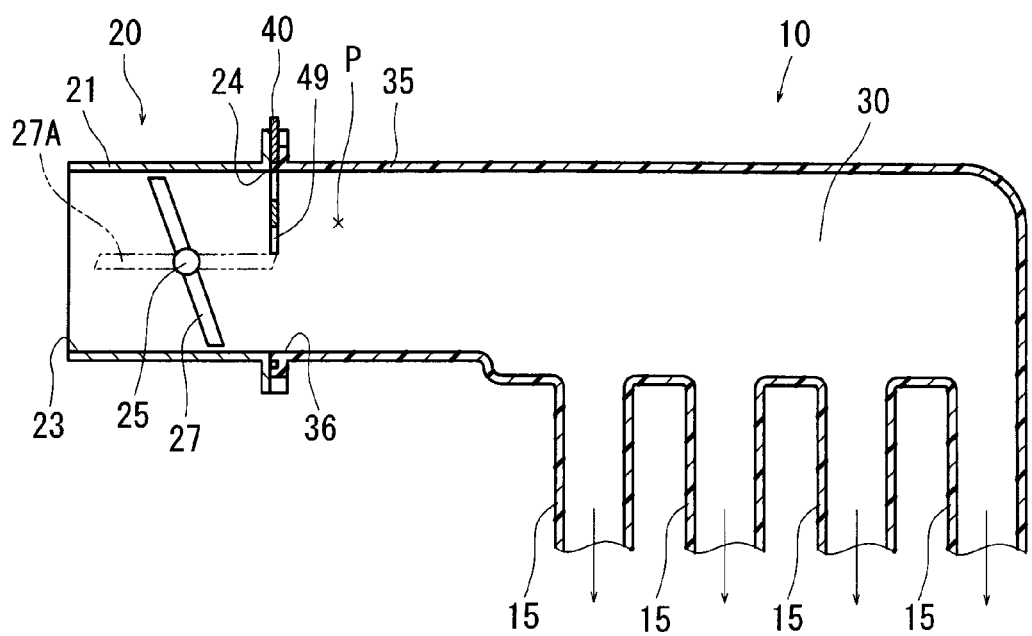
FIG. 1 is a schematic cross sectional view of an intake manifold and a throttle valve apparatus.

FIG. 1 is a schematic cross sectional view showing inner structures of an intake manifold 10 and a throttle valve apparatus 20.

The intake manifold 10 is provided for introducing incoming air into an engine (not shown). Inside this intake manifold 10, the incoming air flows from an upstream side (left side in FIG. 1) to a downstream side (lower right side). In detail, the throttle valve apparatus 20 is provided at the upstream side of the intake manifold 10, and branched pips 15 constituting a part of the intake manifold 10 are provided at the downstream side.

Throttle valve apparatus 20 opens and closes in order to control an amount of the incoming air. The throttle valve apparatus 20 has a throttle body 21 formed in a substantial cylindrical shape and a throttle valve 27 rotatably supported by a valve shaft 25 in the throttle body 21. The throttle body 21 has an outer open end 23 at a left side in FIG. 1, which can be connected with an ambient air inlet (not shown) in a fluid communication manner, and an inner open end 24 at a right side in FIG. 1, which can be connected with an inflow open end 36 of the intake manifold 10 in a fluid communication manner. Thus, the throttle body 21 defines an inner pathway therein for introducing the ambient air from the ambient air inlet into the intake manifold 10, and the inner pathway where the incoming air flows is formed to have a substantially circular cross section perpendicular to an air flowing direction. The inner open end 24 has a connecting structure having an outer flange capable of connecting with the inflow open end 36 of the intake manifold 10 in a fluid communication manner. The throttle valve 27 in a so-called butterfly type is rotatbly supported by the valve shaft 25 in the throttle body 21. The throttle valve 27 is formed in a substantially circular plate shape capable of closing the inner pathway as well as throttle valves generally used. The throttle valve 27 supported by the valve shaft 25 rotates and thus opens and closes the inner pathway in order to control the amount of the incoming air.

The intake manifold 10 has the branched pipes 15, a surge tank 30, a conducting pipe 35 and a gasket 40. The branched pipes 15, the surge tank 30 and the conducting pipe 35 are integrally formed due to molding of a resin.

The branched pipes 15 are communicated with the surge tank 30 at its downstream side. This intake manifold 10 has four branched pipes 15, each of which is connected with a corresponding one of four cylinders of the engine (not shown).

When the throttle valve apparatus 20 is opened, the surge tank 30 temporarily keeps the incoming air from the throttle valve apparatus 20. This surge tank 30 is formed to have an internal volume sufficient for keeping the incoming air.

The conducting pipe 35 is provided at the upstream side of the surge tank 30 and is formed in a substantial pipe shape. This conducting pipe 35 defines an air intake pathway P between the throttle valve 27 and the surge tank 30 for flowing the incoming air from the throttle valve apparatus 20 into the surge tank 30. Thus, the conducting pipe 35 has an inner space corresponding to the air intake pathway P, which the incoming air flows through, having a substantially circular cross section perpendicular to the air flowing direction as well as the inner pathway of the throttle body 21.

Figure 2:
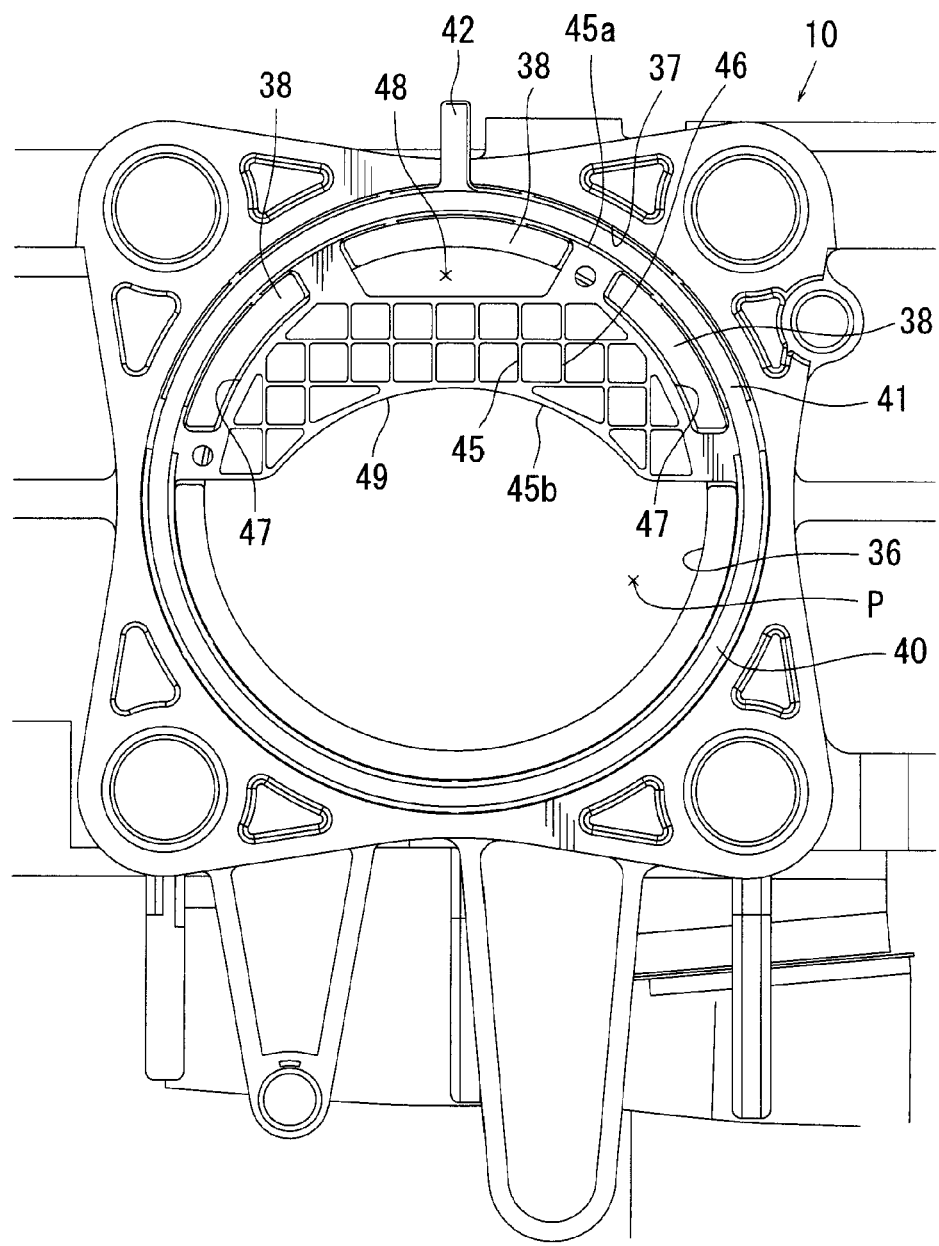
FIG. 2 is a front view showing an inflow open end provided with a gasket member.
Figure 3:
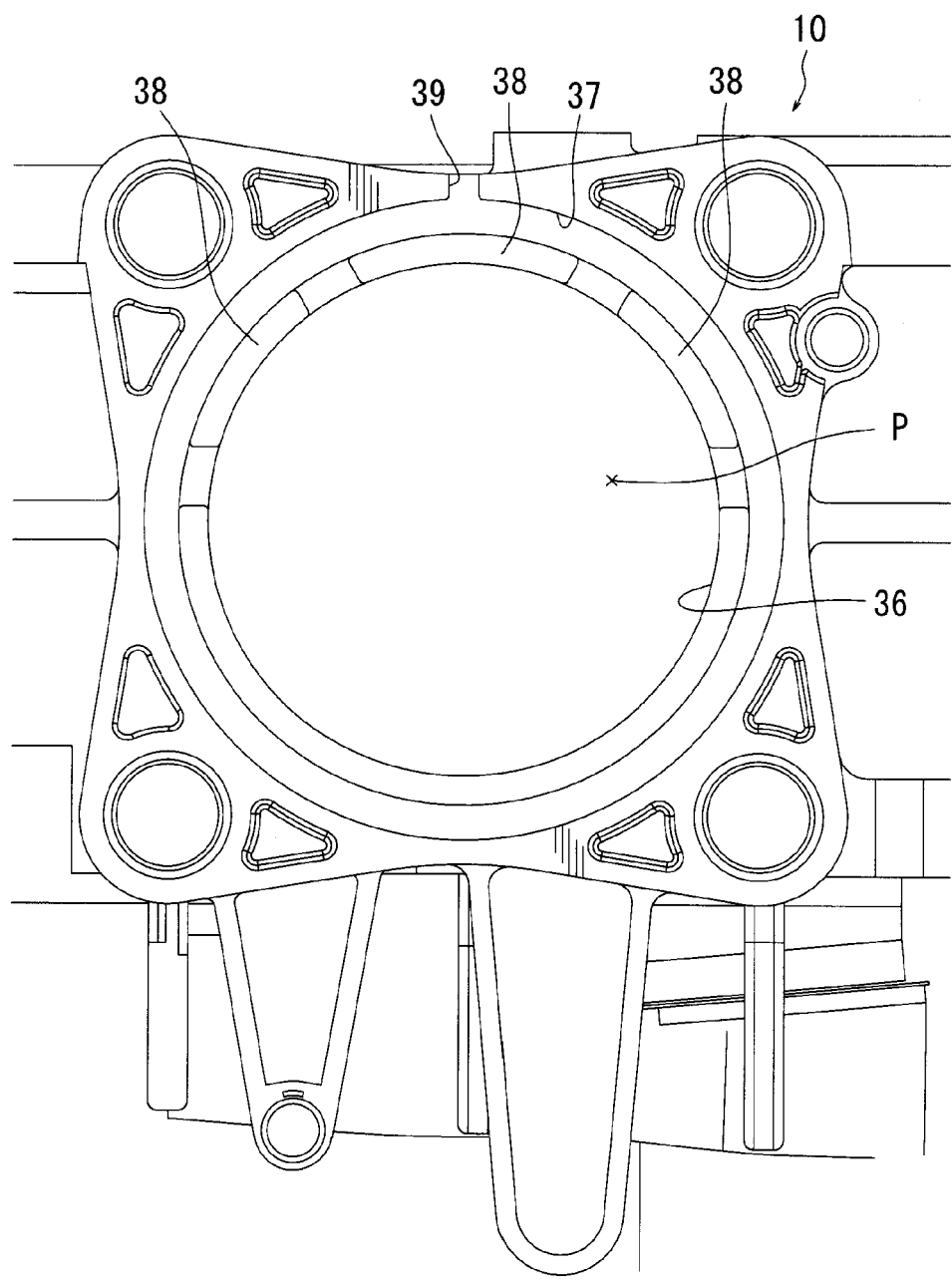
FIG. 3 is a front view showing the inflow open end not provided with the gasket member.

FIG. 2 is a front view of the inflow open end 36 provided with the gasket 40. FIG. 3 is a front view of the inflow open end 36 not provided with the gasket 40. The intake manifold 10 has the inflow open end 36, which is connected with the inner open end 24 of the throttle valve apparatus 20 in the fluid communication manner, at an upstream end (left end in FIG. 1) of the conducting pipe 35. The inflow open end 36 defines a part of the air intake pathway P for the incoming air of this disclosure as well as the conducting pipe 35. Therefore, the inflow open end 36 is formed to function as a wall of the air intake pathway P for the incoming air. As shown in FIG. 1, the inflow open end 36 has a connecting structure with an outer flange, which can be connected with the inner open end 24 of the throttle valve apparatus 20 in the fluid communication manner. The outer flanges of the inflow open end 36 and the inner open end 24 are engaged with each other by a bolt and a nut (not shown) in order to connect the inflow open end 36 with the inner open end 24.

The inflow open end 36 having such connecting structure is provided with the gasket 40, which will be described. In particular, as shown in FIG. 1, the gasket 40 is placed between the inflow open end 36 and the inner open end 24. Thus, as shown in FIG. 3, a groove 37 configured to be fitted with a sealing support portion 41 of the gasket 40 is formed at the inflow open end 36 constructed as the wall for the air intake pathway P. This groove 37 is fitted with the sealing support portion 41 of the gasket 40. In addition, as shown in FIG. 3, insertion portions 38 in projected rim shapes are provided radially inside the groove 37. The insertion portions 38 are configured to be inserted and fitted into insertion slots 47 and ventilation openings 48 of the gasket 40, which will be described below, and to be formed as a portion of the wall defining the air intake pathway P. A groove 39 is fitted with a tab 42 of the sealing support portion 41 in order to allow an operator can check the tab 42 protruding through the groove 39.

Figure 4:
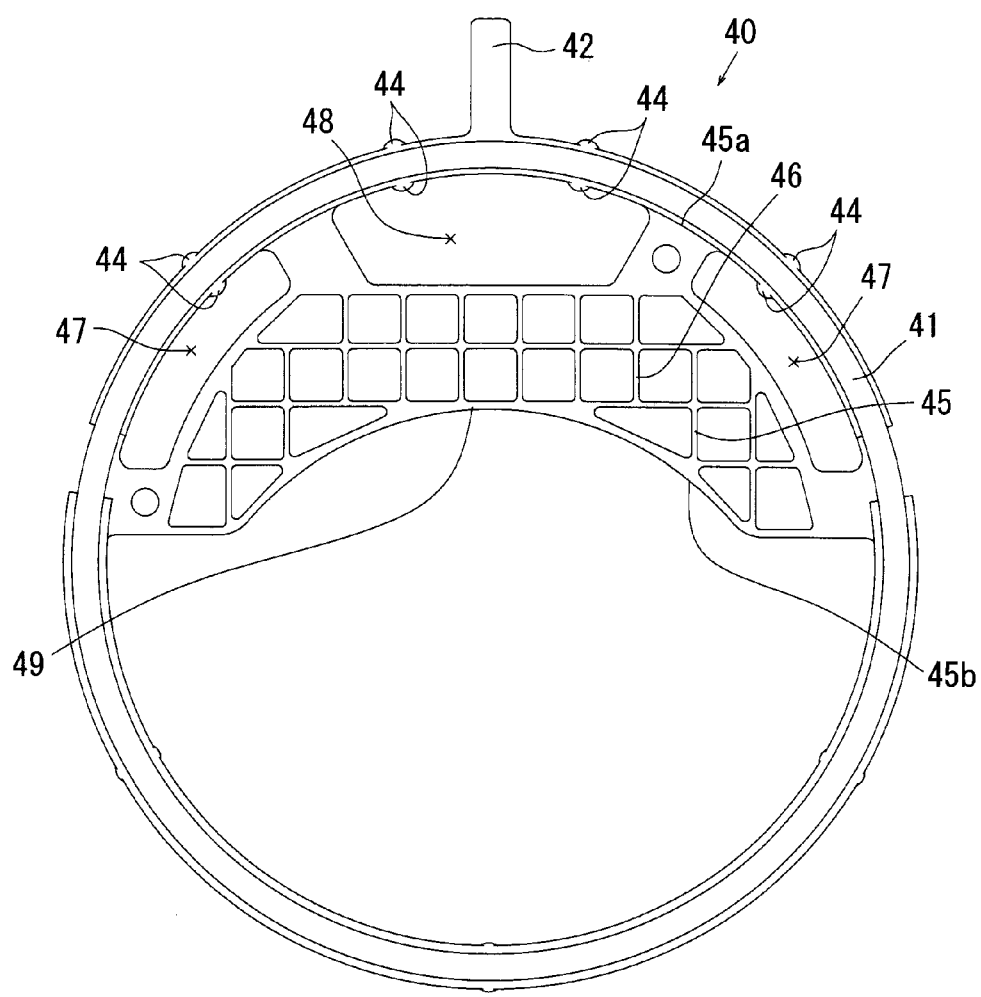
FIG. 4 is a front view of the gasket.

Next, the gasket 40, which is attached to the inflow open end 36, will be described. FIG. 4 is a front view of the gasket 40.

The gasket 40 is placed downstream of the throttle valve 27, in detail, near the throttle valve 27 in the air intake pathway P between the throttle valve 27 and the surge tank 30. The gasket 40 is attached to the inflow open end 36 and is placed downstream of the throttle valve 27 in the air intake pathway P by fitting the sealing support portion 41 into the groove 37 of the inflow open end 36.

As shown in FIG. 4, the gasket 40 has the sealing support portion 41 formed in a substantially ring shape and a noise prevention net 45 formed in a net-like shape. The sealing support portion 41 is fitted into the groove 37 formed in the inflow open end 36 as described above. The sealing support portion 41 is composed of elastic deformable rubber resin like O-ring. The sealing support portion 41 can support the noise prevention net 45, which will be described below, and has a function as a gasket for sealing connection between the intake manifold 10 and the throttle valve apparatus 20. That is, the gasket 40 improves airtightness between the intake manifold 10 and the throttle valve apparatus 20 due to the sealing support portion 41 when the inner open end 24 of the throttle valve apparatus 20 is connected and communicated with the inflow open end 36 of the intake manifold 10. A plurality of projections 44 are formed on an outer circumferential surface of the sealing support portion 41 such that the projections 44 prevent displacement of the sealing support portion 41, which is fitted into the groove 37. The noise prevention net 45 is placed inside the sealing support portion 41 in the radial direction and is integrated with the sealing support portion 41. The sealing support portion 41 has the tab 42 such that an operator can check from outside of the intake manifold 10 whether the sealing support portion 41 is attached or not.

The noise prevention net 45 decreases a volume of the noise while allowing the incoming air flowing from the throttle valve 27 to pass through there. As shown in FIG. 1, the noise prevention net 45 is formed such that the noise prevention net 45 covers less than half of the circular cross section of the air intake pathway P, which corresponds to one side where the throttle valve 27 opens. In detail, the noise prevention net 45 is provided within the half of the circular cross section of the air intake pathway P, which corresponds to one of halves of a circular cross section divided by the valve shaft 25 in the air intake pathway P, and is placed such that a center of an outer circumference of the noise prevention net 45 is positioned at an area corresponding to an initially-opened area by rotation of the throttle valve 27. In more detail, the throttle valve 27 has a first half (upper half in FIG. 1) and a second half (lower half in FIG. 1), which are substantially divided by the valve shaft 25. When the throttle valve 27 of the throttle valve apparatus 20 pivots in an anticlockwise direction on the valve shaft 25 in FIG. 1 in order to open, the first half of the throttle valve 27 moves toward upstream side whereas the second half moves toward downstream side. The noise prevention net 45 of the gasket 40 is positioned corresponding to the upper half of the throttle valve 27, i.e., such that the noise prevention net 45 is closer to the first half than the second one.

As shown in FIG. 4, an outer section 45a of the noise prevention net 45 is integrally engaged with the sealing support portion 41. The outer section 45a of the noise prevention net 45 defines three openings formed at substantially equal interval and labeled with "47", "47" and "48", respectively. A net portion formed in reticular pattern, which is labeled with "46", and the openings in the noise prevention net 45 are formed by punching a metal plate.

The right one and the left one of the openings in FIG. 4 are configured as insertion slot 47. As described above, the insertion slots 47 respectively receive the insertion portions 38 of the inflow open end 36 when the gasket 40 is attached to the inflow open end 36. Accordingly, each of the insertion slots 47 is formed to fit corresponding one of the insertion portions 38.

On the other hand, a central one of the openings formed in the noise prevention net 45 is configured as ventilation opening 48 to be positioned near or along an outer circumference of the air intake pathway P, i.e., the inner wall of the conducting pipe 35 in FIG. 4. That is, when the gasket 40 is attached to the inflow open end 36, the ventilation opening 48 makes the incoming air, which flows from the throttle valve 27, easily pass through there. This ventilation opening 48 is formed near and along an outer circumference of the noise prevention net 45 and is positioned along the outer circumference of the air intake pathway P in the inflow open end 36. In detail, the ventilation opening 48 is formed by cutting out a part of the outer circumference of the noise prevention net 45 corresponding to an initially-opening area of the throttle valve 27, i.e., a periphery in the first half, which most depart from the valve shaft 25 (upper end in FIG. 1). The ventilation opening 48 has a broader width toward a center of the gasket 40 than that of the insertion portion 38 toward a center of the inflow open end 36. That is, when the gasket 40 is attached to the inflow open end 36, one of the insertion portions 38 is inserted into the ventilation opening 48 as well as the insertion slots 47. Accordingly, although that the insertion portion 38 is inserted into the ventilation opening 48, the ventilation opening 48 can keep a space for making the incoming air from the throttle valve 27 pass through there because the ventilation opening 48 has the broader width than that of the insertion portion 38 toward the center of the inflow open end 36. On the other hand, when the insertion portions 38 are inserted into the insertion slots 47, respectively, the insertion slots 47 are substantially blocked with the insertion portions 38 and the noise prevention net 45 is located along the inward surface of the inflow open end 36.

The net portion 46 of the noise prevention net 45 is formed in a lattice shape, and allows the incoming air from the throttle valve 27 to pass through there and simultaneously divides the incoming air. In this way, the noise prevention net 45 can decrease a volume of noise caused by the incoming air.

The noise prevention net 45 has a valve relief 49 in an arc shape for avoiding interference by the opened throttle valve 27. In detail, as shown in FIG. 4, an inner section 45b of the noise prevention net 45 has the valve relief 49 in the arc shape curving outwardly. The valve relief 49 is formed in the noise prevention net 45 such that a fully-opening throttle valve 27A in FIG. 1 does not contact with the noise prevention net 45. That is, if the valve relief 49 is not formed in the noise prevention net 45, when the throttle valve 27 fully opens, the noise prevention net 45 contacts with the throttle valve 27 and prevent fully-opening of the throttle valve 27. Therefore, the noise prevention net 45 having the valve relief 49 does not interfere with opening of the throttle valve 27.

The intake manifold 10 of the first embodiment has following advantageous effects.

According to the intake manifold 10, the gasket 40 is provided inside the inflow open end 36 of the conducting pipe 35 (intake manifold 10), i.e. in the air intake pathway P downstream of the throttle valve 27, and the gasket 40 has the noise prevention net 45 for decreasing the volume of the noise. Therefore, the noise prevention net 45 of the gasket 40 can reduce the volume of the noise caused by eddy of the incoming air from the throttle valve 27. In addition, because the noise prevention net 45 has the ventilation opening 48, which is positioned along the inward surface of the inflow open end 36, for allowing the incoming air from the throttle valve 27 to easily pass through the noise prevention net 45, it is able to decrease flow resistance of the incoming air introduced by the throttle valve apparatus 20. Therefore, in the intake manifold 10 for introducing the incoming air into the engine, it is able to reduce the volume of the noise while increasing an amount of the incoming air flowing into the surge tank 30.

Furthermore, according to the intake manifold 10, because the noise prevention net 45 is formed by punching the metal plate, the gasket 40 can be manufactured easily and at low cost.

According to the intake manifold 10, the gasket 40 has the sealing support portion 41 for being attached to the inflow open end 36 and supporting the noise prevention net 45. Thus, when the gasket 40 is attached to the intake manifold 10, the sealing support portion 41 attached to the inflow open end 36 supports the noise prevention net 45. Accordingly, other members such as connector are not required for placing the gasket 40 in the air intake pathway P, and it is able to reduce the number of members required for placing the gasket 40, thereby reducing cost for such process and simplifying the process.

The noise prevention net 45 supported by the sealing support portion 41 defines the insertion slots 47 for receiving the insertion portions 38 formed on the inflow open end 36 such that when the gasket 40 is placed in the air intake pathway P, the noise prevention net 45 is positioned along the outer circumference of the air intake pathway P. Thus, when the gasket 40 is attached to the inflow open end 36, the noise prevention net 45 is placed along the outer circumference of the air intake pathway P. Accordingly, the gasket 40 can ensure airtightness without any sealing member. So, the number of members required for mounting of the noise prevention net 45 can be reduced and it is able to decrease cost and to simplify mounting process. In addition, the sealing support portion 41 can also have a function to seal the connection between the intake manifold 10 and the throttle valve apparatus 20.

According to the intake manifold 10, the noise prevention net 45 has the arc-shaped valve relief 49 for avoiding contact with the fully-opened throttle valve 27. Thus, the fully-opened throttle valve 27 is not interfered by the noise prevention net 45. That is, when the gasket is attached, the throttle valve 27 can perform effectively without problems.

The intake manifold according to a second embodiment different from the first embodiment will be described in reference to the drawings. The intake manifold 10 according to the second embodiment (not shown) is different from that of the first embodiment with respect to structure of the gasket only. Thus, the gasket, which is labeled with "60", for the intake manifold 10 according to the second embodiment will be described, and other structures will not be described. Components for the gasket 60 of the second embodiment same as those of the gasket 40 of the first embodiment are labeled with the same symbols and will not be described.

Figure 5:
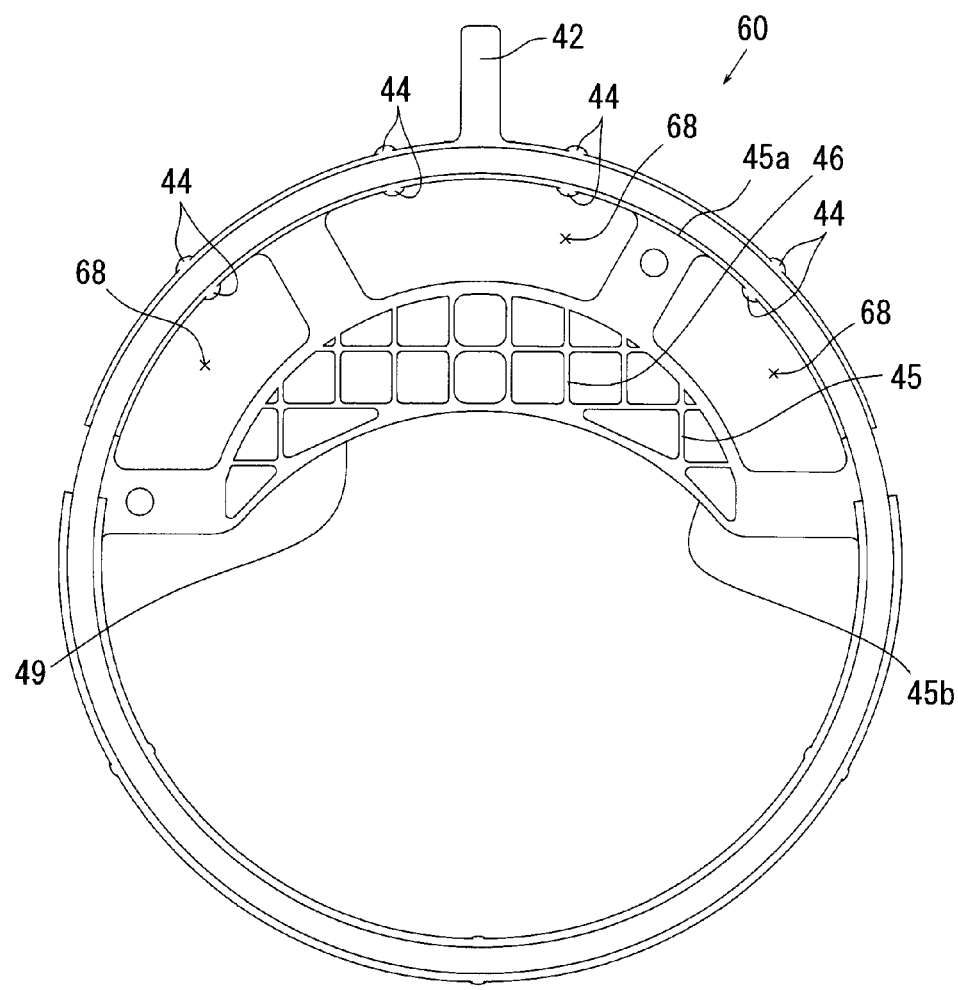
FIG. 5 is a front view of the gasket according to a second embodiment.

FIG. 5 is a front view of the gasket 60 according to the second embodiment. That is, the gasket 60 of the second embodiment shown in FIG. 5 is different from the gasket 40 of the first embodiment with respect to ventilation openings 68 only. In detail, the gasket 60 of the second embodiment has two additional ventilation openings 68 instead of the insertion slots 47 of the first embodiment. In more detail, the three ventilation openings 68 like the ventilation openings 48 of the first embodiment are aligned along the outer circumference of the noise prevention net 45. The three ventilation openings 68 are formed by, e.g., partially cutting out the outer section of the noise prevention net 45 such that widths of the ventilation openings 68 are broader toward the center of the gasket 40 than the widths of the insertion portions 38 of the inflow open end 36. When the gasket 60 is attached to the inflow open end 36, each of the ventilation openings 68 receives one of the insertion portions 38, respectively. The ventilation openings 68 have broader widths than the insertion portions 38 and are not completely blocked with the insertion portions 38, which are inserted into the ventilation openings 68. Thus, when the gasket 60 is attached to the inflow open end 36, the ventilation openings 68 can allow the incoming air from the throttle valve 27 to easily pass through there.

According to the intake manifold 10 of the second embodiment, because the gasket 60 has the ventilation openings 68 at a larger area along the circumferential direction than the gasket 40 of the first embodiment, airflow resistance of the incoming air introduced by the throttle valve apparatus 20 can be decreased more effectively. Therefore, it is able to increase the amount of the incoming air flowing into the surge tank 30.

A third embodiment different from the first and the second embodiments will be described in reference to the drawings. The intake manifold of the third embodiment (not shown) is different from those of the first and the second embodiments with respect to the gasket only. Therefore, the gasket 70 for the intake manifold 10 of the third embodiment only will be described, and other structures will not be described. Components of the gasket 70 same as those of the gasket 40, 60 are labeled with the same symbols and will not be described.

Figure 6:
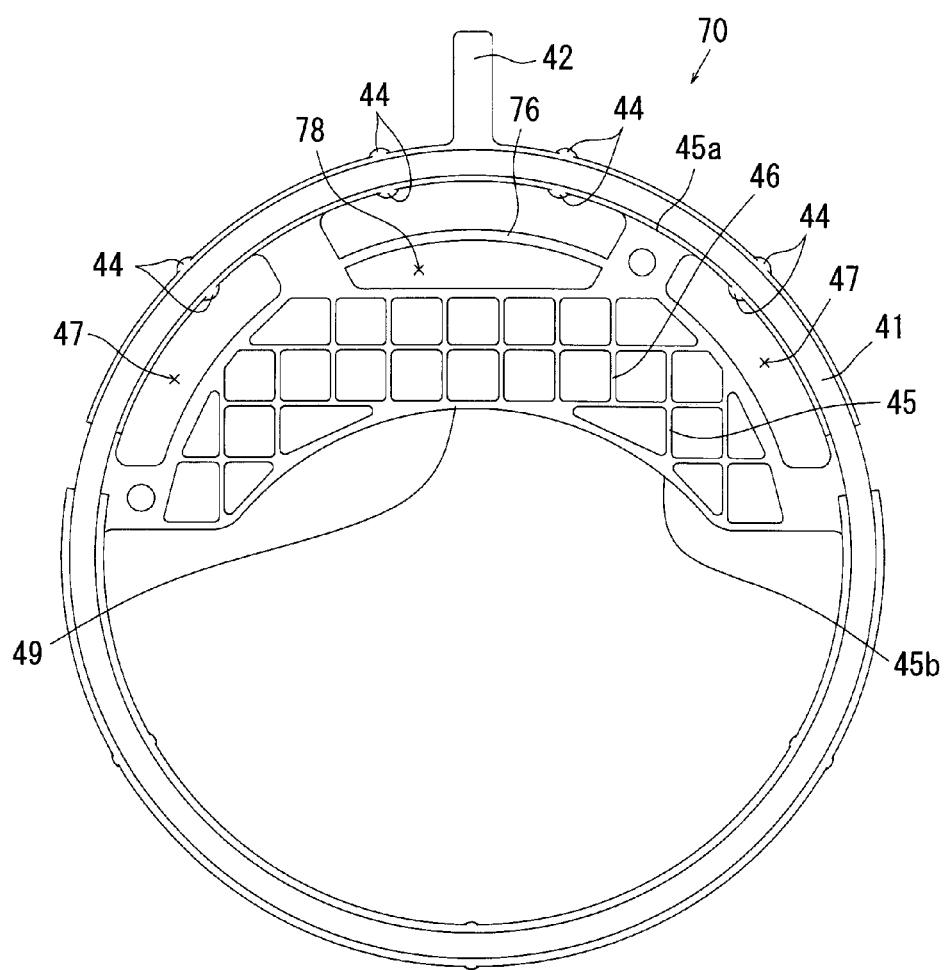
FIG. 6 is a front view of the gasket according to a third embodiment.

FIG. 6 is a front view of the gasket 70 according to the third embodiment. The gasket 70 of the third embodiment in FIG. 6 is different from the gasket 40 of the first embodiment with respect to structure of the ventilation opening 48 only. In detail, the gasket 70 of the third embodiment additionally has a curved strip 76 at the ventilation opening for dividing the ventilation opening into an air hole 78 and an insertion slot like the insertion slot 47. When the gasket 70 is attached to the inflow open end 36, the air hole 78 is positioned along the inward surface of the inflow open end 36, which defines the air intake pathway P. The gasket 70 is different from the gasket 40 of the first embodiment with respect to the curved strip 76 defining the air hole 78.

According to the intake manifold 10 of the third embodiment, the ventilation opening 48 of the gasket 40 of the first embodiment is divided into two areas by the strip 76. That is, the strip 76 and the outer section 45a of the noise prevention net 45 defines the insertion slot (like the insertion slot 47) outside of the air hole 78 in the radial direction for receiving the insertion portion 38, so it is able to improve stability of the gasket 70 attached to the inflow open end 36. When the gasket 70 is attached to the inflow open end 36, the air hole 78 of the gasket 70 of the third embodiment allows the incoming air from the throttle valve 27 to easily pass through there as well as the ventilation opening 48 of the gasket 40 of the first embodiment.

The intake manifold of this disclosure is not limited to the above-described embodiments and can be modified adequately without departing form the scope of the invention.

For example, the ventilation openings 48, 68, the air hole 78, the insertion slots 47 and the like are not limited to their shape described above and can be modified adequately.

This invention claims:

1. An intake manifold for preventing flow noise, the intake manifold capable of being connected with a throttle valve apparatus, which opens and closes in order to control an amount of air flowing through there, said intake manifold comprising:
    a conducting pipe defining an air intake pathway therein;
    a surge tank receiving the air flowing from the throttle valve apparatus through the air intake pathway; and
    a noise prevention net placed within a half of a cross section of the air intake pathway,
    a gasket having a sealing member in a ring shape,
    wherein the noise prevention net has a net portion for reducing noise volume and defines at least one opening outside of the net portion in a radial direction in the cross-section of the air intake pathway such that the at least one opening is positioned along or near an inner wall of the conducting pipe,
    wherein the noise prevention net has a net portion at its center area and an outer portion outside of the net portion in a radial direction in the cross-section of the air intake pathway, the net portion being formed in a lattice shape, the outer portion defining a plurality of openings positioned near an inner wall of the conducting pipe,
    wherein the openings are larger than spaces between the lattice of the net portion,
    wherein the opening positioned in the middle in a circumferential direction is larger than the other openings,
    wherein the noise prevention net is integrated with the sealing member of the gasket,
    wherein the conducting pipe has an insertion portion on the inner wall for engaging with the noise prevention net,
    the noise prevention net defines a slot for receiving the insertion portion, and
    when the insertion portion is fitted into the slot, the nose prevention net is positioned along the inner wall of the conducting pipe.

2. The intake manifold according to claim 1, wherein
    the throttle valve apparatus has a throttle valve pivotally supported by a shaft and pivoting around the shaft in order to open and close the throttle valve apparatus; the throttle valve is divided into a first half and a second half by the shaft;
    when the throttle valve pivots, the first half moves toward an upstream side whereas the second half moves toward a downstream side in the air intake pathway; and
    the first half is on the same half of the cross-section of the conducting pipe as the noise prevention net.

3. The intake manifold according to claim 1, wherein the noise prevention net is manufactured by punching a metal plate.

4. The intake manifold according to claim 1, wherein the noise prevention net has a valve relief in arc shape curved outwardly in order to prevent contact with the throttle valve.

5. The intake manifold according to claim 1, wherein the outer portion is shaped such that each of the openings has a smooth entire circumference.

* * * * *